United States Patent [19]

Ekchian et al.

[11] Patent Number: 5,210,798
[45] Date of Patent: May 11, 1993

[54] VECTOR NEURAL NETWORK FOR LOW SIGNAL-TO-NOISE RATIO DETECTION OF A TARGET

[75] Inventors: Leon K. Ekchian, Northridge; David D. Johnson, Simi Valley; William F. Smith, Los Angeles, all of Calif.

[73] Assignee: Litton Systems, Inc., Beverly Hills, Calif.

[21] Appl. No.: 667,633

[22] Filed: Mar. 11, 1991

Related U.S. Application Data

[63] Continuation-in-part of Ser. No. 554,371, Jul. 19, 1990.

[51] Int. Cl.$^5$ .............................................. G06K 9/62
[52] U.S. Cl. ...................................... 382/14; 358/125; 342/96; 395/22
[58] Field of Search ............................ 342/96; 382/14; 358/125; 395/22

[56] References Cited

U.S. PATENT DOCUMENTS

| | | | |
|---|---|---|---|
| 4,121,192 | 10/1978 | Wilson | 382/68 |
| 4,906,940 | 3/1990 | Greene et al. | 382/16 |
| 4,931,868 | 6/1990 | Kadar | 358/125 |

OTHER PUBLICATIONS

Cho et al., "Strategies for Applying Neural Networks to Real World Problems" International Neural Network Conference, Jul. 9–13, 1990.

Lupo, "Defense Applications of Neural Networks", IEEE Communications Magazine, Nov. 1989.

Primary Examiner—Leo H. Boudreau
Assistant Examiner—Barry S. Stellrecht
Attorney, Agent, or Firm—Donald J. Ellingsberg

[57] ABSTRACT

A vector neural network (VNN) of interconnected neurons is provided in transition mappings of potential targets wherein the threshold (energy) of a single frame does not provide adequate information (energy) to declare a target position. The VNN enhances the signal-to-noise ratio (SNR) by integrating target energy over multiple frames including the steps of postulating massive numbers of target tracks (the hypotheses), propagating these target tracks over multiple frames, and accommodating different velocity target by pixel quantization. The VNN then defers thresholding to subsequent target stages when higher SNR's are prevalent so that the loss of target information is minimized, and the VNN can declare both target location and velocity. The VNN can further include target maneuver detection by a process of energy balancing hypotheses.

3 Claims, 12 Drawing Sheets

(EXCERPT FROM MULTITARGET-MULTISENSOR TRACKING
Y. BAR-SHALOM, ARTECH HOUSE, 1990)

VECTOR NEURAL NETWORK FOR LOW SIGNAL-TO-NOISE RATIO DETECTION OF A TARGET

COPYRIGHT MATERIAL

The disclosure of this patent contains material which is the subject of copyright protection. Reproduction of the patent document as it appears in the Patent and Trademark Office is permitted in furtherance of the United States Patent Laws (Title 35 United States Code). The copyright owner reserves all other rights under the United States Copyright Laws (Title 17 United States Code).

This is a continuation-in-part of copending application(s) Ser. No. 07/554,371 filed on Jul. 19, 1991.

CROSS-REFERENCE TO RELATED APPLICATION

U.S. application Ser. No. 07/509,174, filed Apr. 16, 1990 titled "A Barometer Neuron for a Neural Network" by Leon K. Ekchian, David D. Johnson, and William F. Smith, and assigned to the same assignee as the present invention.

BACKGROUND OF THE INVENTION

1. Field of the Invention

A vector neural network (VNN) is a network of interconnected neurons with a topology which supports the propagation of activations in several different directions through the network. The network topology is determined by the transition mapping. The weight associated with each interconnect represents the neuron's contribution to the activation level of a downstream or subsequent neuron. The transfer function can be linear or non-linear.

The above-identified cross-reference disclosed applying neural network technology to a plot/track association problem. Plot/track association in a track-while-scan operation consists of assigning radar plots to predicted track positions; an important feature of all track-while-scan systems.

It is necessary, however, prior to assigning the radar plots to predicted track positions that the targets first are detected.

The present invention applies neural network technology to detect a target by utilizing mosaic sensors and a track-before-detect approach. This is particularly necessary for low signal-to-noise ratio (SNR) detection of point source targets. The general concensus in the literature is that very dim targets (SNR<1) cannot be detected by merely assembling trajectories based on threshold frames, even after using optimal SNR-enhancement filtering. Applying thresholding separately to each frame irreversibly discards extremely valuable information, and post-assembling trajectories cannot recoup the lost information (see Y. Barniv, "Dynamic Programming Algorithm for Detecting Dim Moving Targets"; *Multi-Target Multi-Sensor Tracking: Advanced Applications*, Y. Bar-Shalom (Editor), Artech House, 1990). One alternative is to postulate the entire trajectory of the target, integrate the target's signal along its entire trajectory, and threshold the integrated signal which would have significantly higher SNR. The complexity of the problem lies in the fact that the trajectories are unknown and the number of targets is unknown. The optimal detection solution is an exhaustive search of all possible trajectories. For example, assuming that all trajectories move in a straight line, the optimal detection could be performed by passing the data contained in all frames through a bank of matched filters (templates) which describe all possible straight lines. However, the exhaustive trajectory search, although optimal, is computationally intractable.

2. Description of the Related Art

Artificial neural networks are extremely powerful processing systems comprised of a plurality of simple processing elements often configured in layers and extensively interconnected. Artificial neural networks are attempts at processing architectures similar to naturally occurring, biological ones which solve problems that have not yielded to traditional computer methodologies and architectures. The name "neural network" derives from the biological "neuron" which is what each simple processor is called. Each artificial neuron operates in some fashion analogous to its biological counter part, namely generating an output signal which is a function of the weighted sum of the input signals it receives from neighboring neurons, with which it is interconnected. The weighted sum is passed through a "transfer" function to form the neuron's output. The weight of each input link describes the relative contribution of the line's input in computing the neuron's next state. A zero weight indicates that there is effectively no contribution. A negative weight indicates an inhibitory relationship. A positive weight shows an excitatory relationship.

In recent years, the prior art reveals a plethora of different neural network architectures that have been propounded by researchers; the most popular being backward propagation or "back-prop". Back-prop networks consist of an input layer, an output layer and one or more hidden layers to account for non-linearities. The prior art network "learns" by receiving a succession of known inputs and corresponding outputs, and by measuring the difference between the known output it should generate and what it actually produced. This difference is considered to be the error which the network seeks to minimize through appropriately adjusting the internal weights by propagating these errors backward. Thus by repeated "training" sequences, the neural network is "trained" and it converges on a set of appropriate weights and thresholds to be utilized in actual applications; those where the corresponding outputs are no longer known.

The vector neural network (VNN) of the present invention has an architecture which does utilize neurons but it is other than that of back-prop neural network. The VNN is not "trained". The weights in the VNN are control parameters which are selected depending on SNR. The prior art "back-prop" network propagates errors backward during the "training" process, while the VNN utilizes backflow to integrate energy in order to perform energy balancing (for example, to detect maneuvers) during actual implementation. The VNN has a linear transfer function and an extremely sparse interconnected network. Further, there are no hidden layers.

SUMMARY OF THE INVENTION

Briefly, in accordance with the invention, a vector neural network (VNN) provides a means for significantly reducing the optimal trajectory match filter test by utilizing a recursive state-space realization. The VNN effectively acts as an efficient database management system by recursively accounting for all "reasonable" straight-line motion through multiframe space, integrating signal amplitude along these postulated trajectories, and declaring a detection whenever the optimally selected threshold is exceeded. The test is repeated every update at every pixel. Maneuvering target motion is accounted for by an energy balancing technique which allows for performing a contour integration where the contour is determined in real-time. The VNN's output is target declarations which are forwarded to a downstream tracker. The VN plots contain not only the standard positional information, but also target velocity information. To emphasize the additional information contained in the VNN declarations, they are referred to as "vector" plots and the neural network topology is referred to as "Vector" Neural Networks.

Further objects, features, and the attending advantages of the invention will be apparent when the following description is read in view of the drawings.

DESCRIPTION OF THE PREFERRED EMBODIMENTS

A VNN can find use in various known tracking systems. One tracking system where the present invention finds particular use is in a PRIOR ART form of an Infrared (IR) tracking system 16 as is shown by FIG. 1.

Figure 1:
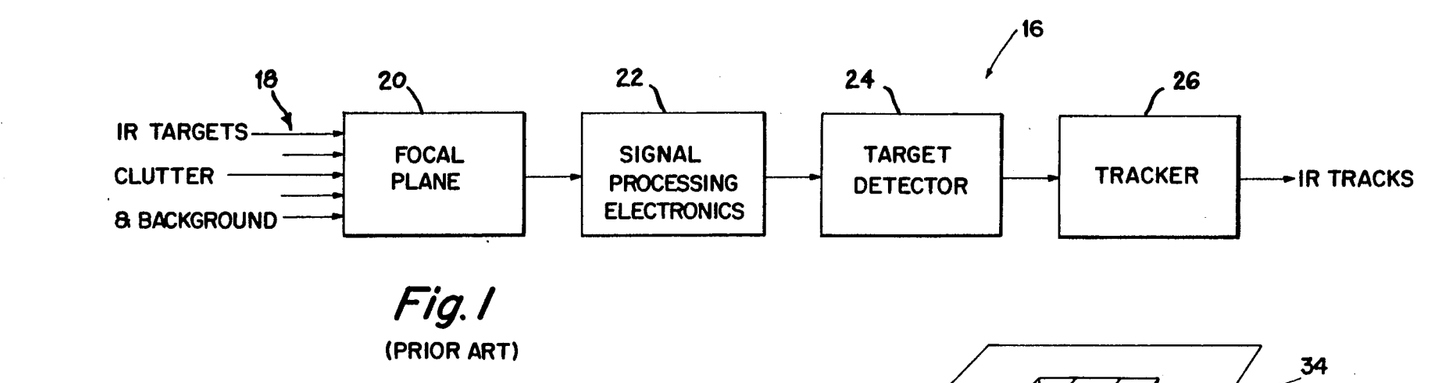
FIG. 1 is a schematic block diagram of one form of PRIOR ART tracking system in which the vector neural network (VNN) of the present invention can find use.

In FIG. 1, several sensor inputs 18 which can include IR targets, clutter, and background are received by a focal plane 20 and directed to a signal processor unit 22. The output signals from the signal processor are inputted to a target detector unit 24 where the VNN of the present invention finds particular use. The target detector extracts targets and directs corresponding target input signals to a tracker unit 26 which then outputs the desired IR tracks from the system 16.

The VNN of the present invention as will be described is housed in the target detector 24. Its output consists of declarations of where the targets are located and their velocity. This is used by the tracker unit 26 for track maintenance and track initiation/deletion.

Figure 2:
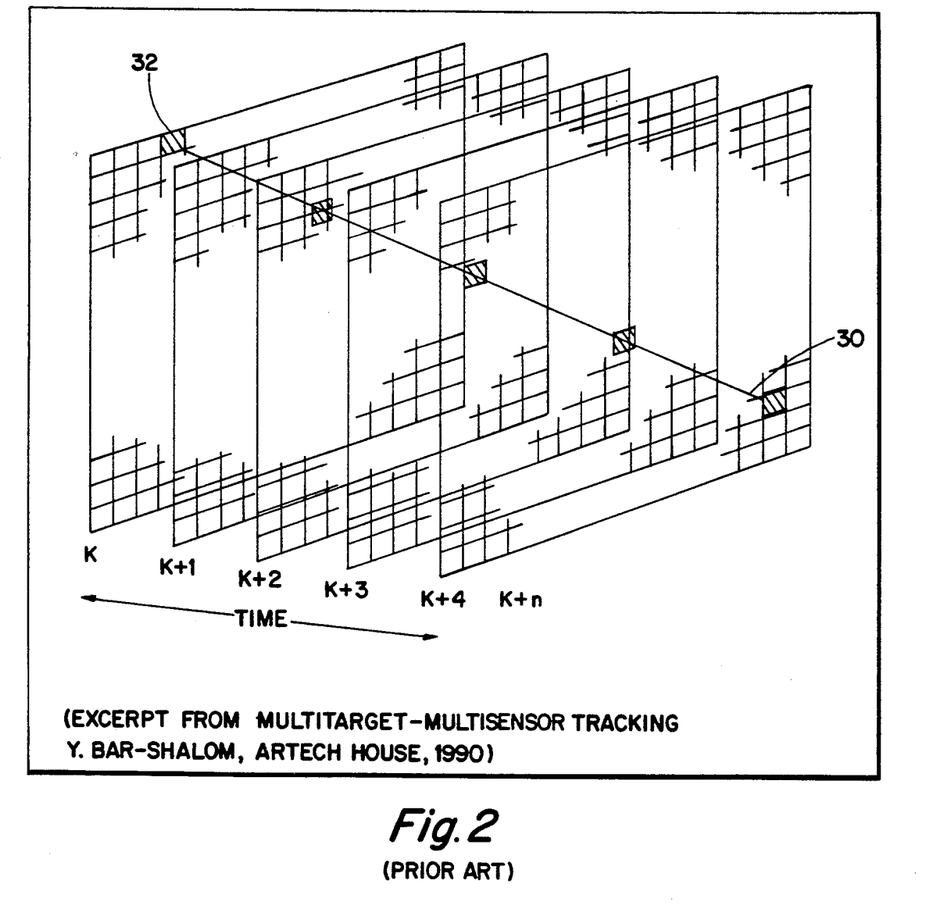
FIG. 2 is a perspective view of a schematic array of PRIOR ART tracking frames as developed by the tracking system of FIG. 1.

A track-before-detect approach is needed for detection of low, signal-to-noise ratio (SNR), sub-pixel targets. FIG. 2 depicts the basic concept of track-before-detect. Under low SNR conditions, one cannot merely threshold a single frame of data (k) to declare target positions, since the false alarm rate will be prohibitive. It is necessary to enhance the SNR by integrating energy over multiple frames (k+1, k+2, k+3, k+4, ..., k+n). This is achieved by postulating massive numbers of hypotheses or tracks, such as track 30, and propagating them over the multiple frames. Data frame (k) is defined by a plurality of pixels, such as pixel 32, arranged in a row-and-column orientation. Assuming that all targets are sub-pixel, then pixel 32 schematically represents an energized pixel. The level of activation of a given pixel is a function of the time, between frames, that a target or targets spend inside the pixel. Thresholding is deferred to latter stages, when higher SNR conditions are prevalent, so as to mitigate the loss of information.

Figure 3:
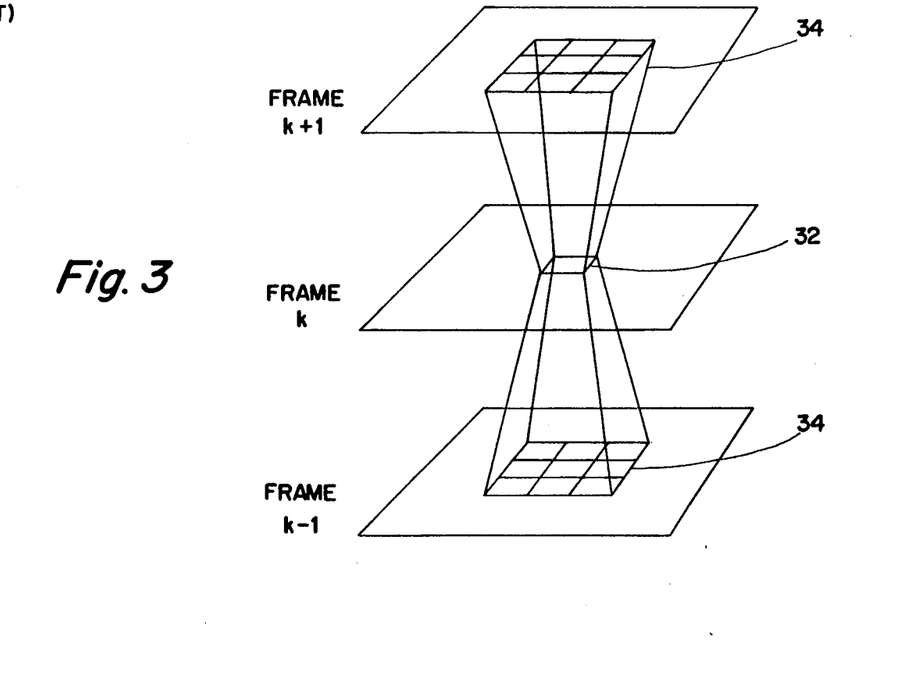
FIG. 3 is an enlarged view of a selected portion of the tracking frames of FIG. 2 as these relate to transition mapping with VNN.

FIG. 3 depicts the transition mapping for a target as represented by energized pixel 32 of frame (k) that is moving less than one pixel a frame and the applicability of the vector neural network (VNN) of the present invention. In using the VNN for transition mapping of a target, the VNN is constructed as follows: The target as represented by pixel 32 of frame (k) has moved from frame (k−1) and is expected to continue, assuming straight-line flight, into frame (k+1). Assigning a field of neurons 34 in the following frame for each pixel in frame k results in a 3×3 row-and-column orientation of nine neurons that reflect the possible target directions of movement from every pixel frame-to-frame.

Figure 4:
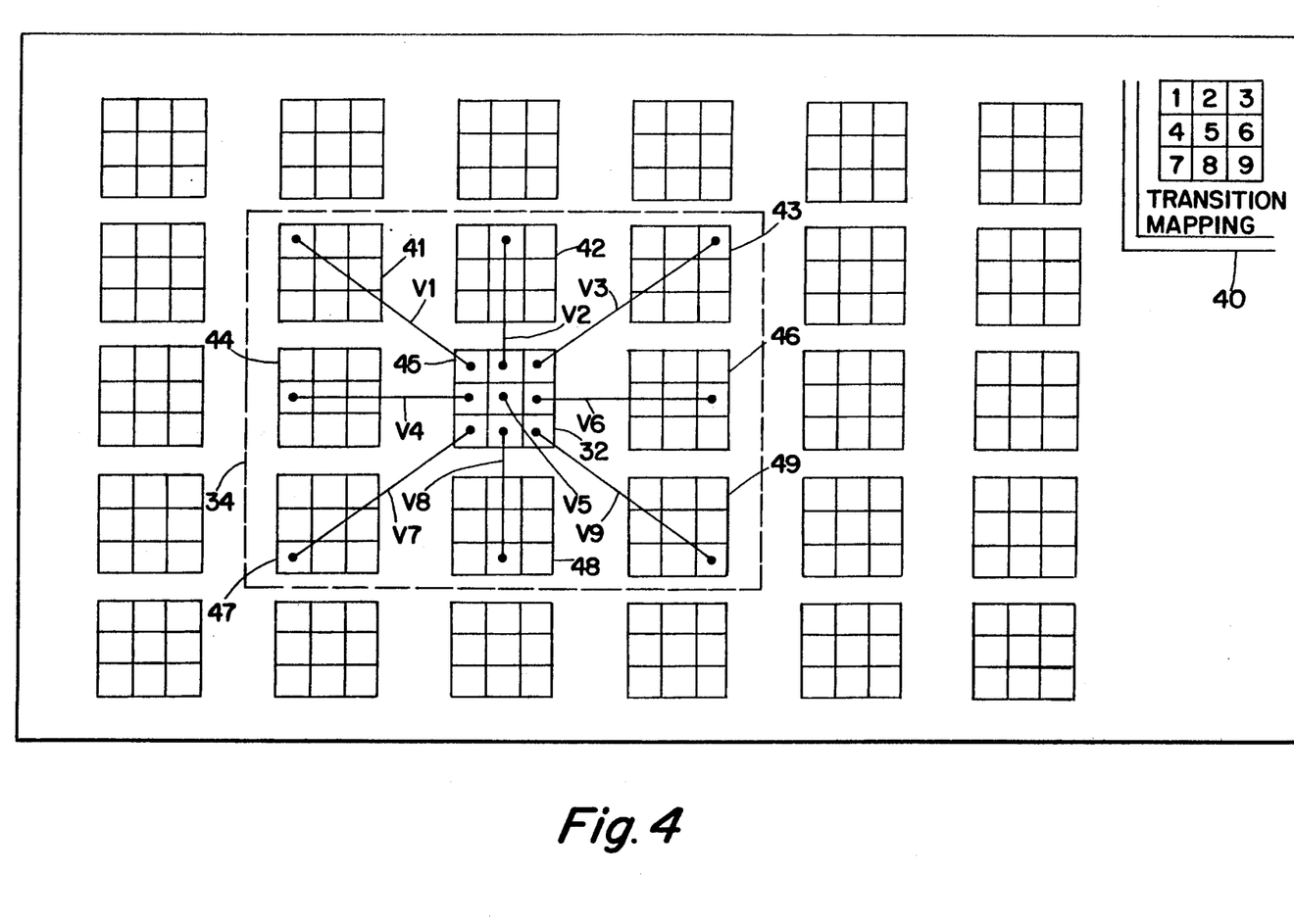
FIG. 4 is a schematic plan view of a selected portion of the transition mapping step of FIG. 3 with VNN.

For ease of description and understanding, the numbering order for this 3×3 orientation of nine neurons for each pixel, such as pixel 32 of frame (k) as shown by FIG. 3, is illustrated by transition mapping window 40 of FIG. 4. The possible target directions from pixel 32 of frame (k) are illustrated by the directionally encoded interconnects V1 through V9 from these nine neuron sites to the corresponding neuron sites in pixels 41 through 49. The encoding of directional flow between pixels that lie along the $i^{th}$ direction, where $i\epsilon\{1,2,...9\}$, is achieved by connecting the respective $i^{th}$ neurons. For example, the VNN has one and only one directional interconnect between paired neurons, as defined by the transition mapping of the instant scenario Thus, V1 interconnects neuron site 1 (see the transition mapping window 40 for these neuron site number locations) of pixel 32 in frame (k) and neuron site 1 of pixel 41 in frame (k+1). This interconnect pattern holds true for all neurons and their respective interconnects.

Figure 5:
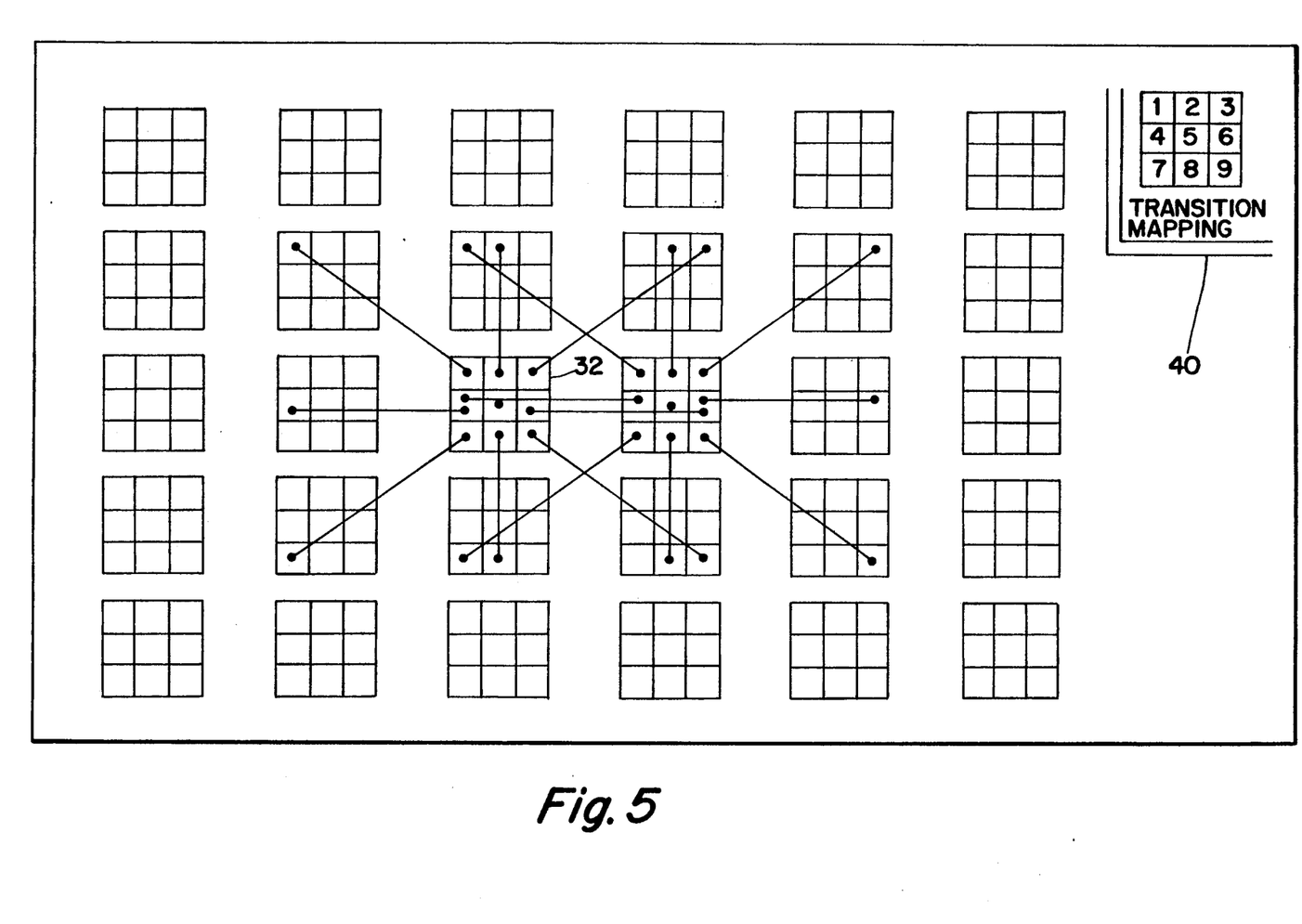
FIG. 5 is another schematic plan view which illustrates a progressive replication of the transition mapping of FIG. 4 using VNN.

How this directional interconnect rule is progressively replicated on all pixels is illustrated by FIG. 5.

With the VNN of the present invention, there is a unique one-to-one mapping (interconnect) between any two neuron sites.

The elemental pixel intensity can be defined by $$\begin{cases} I^{i,j} = x^{i,j} + v^{i,j} & H_1 \text{: TARGET PRESENT IN} \\ & (i,j)^{th} \text{ PIXEL} \\ I^{i,j} = v^{i,j} & H_0 \text{: NO TARGET PRESENT IN} \\ & (i,j)^{th} \text{ PIXEL} \end{cases}$$

WHERE $I^{i,j}$ - INTENSITY OF $(i,j)^{th}$ PIXEL
$x^{i,j}$ - CONTRIBUTION OF TARGET TO THE INTENSITY OF PIXEL $(i,j)$
$v^{i,j}$ - BACKGROUND NOISE

While the integrated energy in the lth direction corresponding to pixel (i,j) at frame k is given by $$y_{k,l}^{i,j} = \alpha \, y^{i,j} + \beta \, I_k^{i,j}$$

$$y_{1,l}^{i,j} = y_{0,l}^{i,j} + \beta \, I_1^{i,j}$$

WHERE $y_{0,l}^{i,j}$ - INITIAL CONDITION
$(i,j)$ - DENOTES THE $i,j^{th}$ PIXEL
$l$ - DENOTES THE $l^{th}$ DIRECTION

The parameter $\alpha$ and $\beta$ are control parameters which are adjusted as a function of SNR and serve as the weights of the neural network. The contribution of the upstream neurons in captured by $\alpha$, while $\beta$ represents the weight associated with the sensor input.

Figure 6:
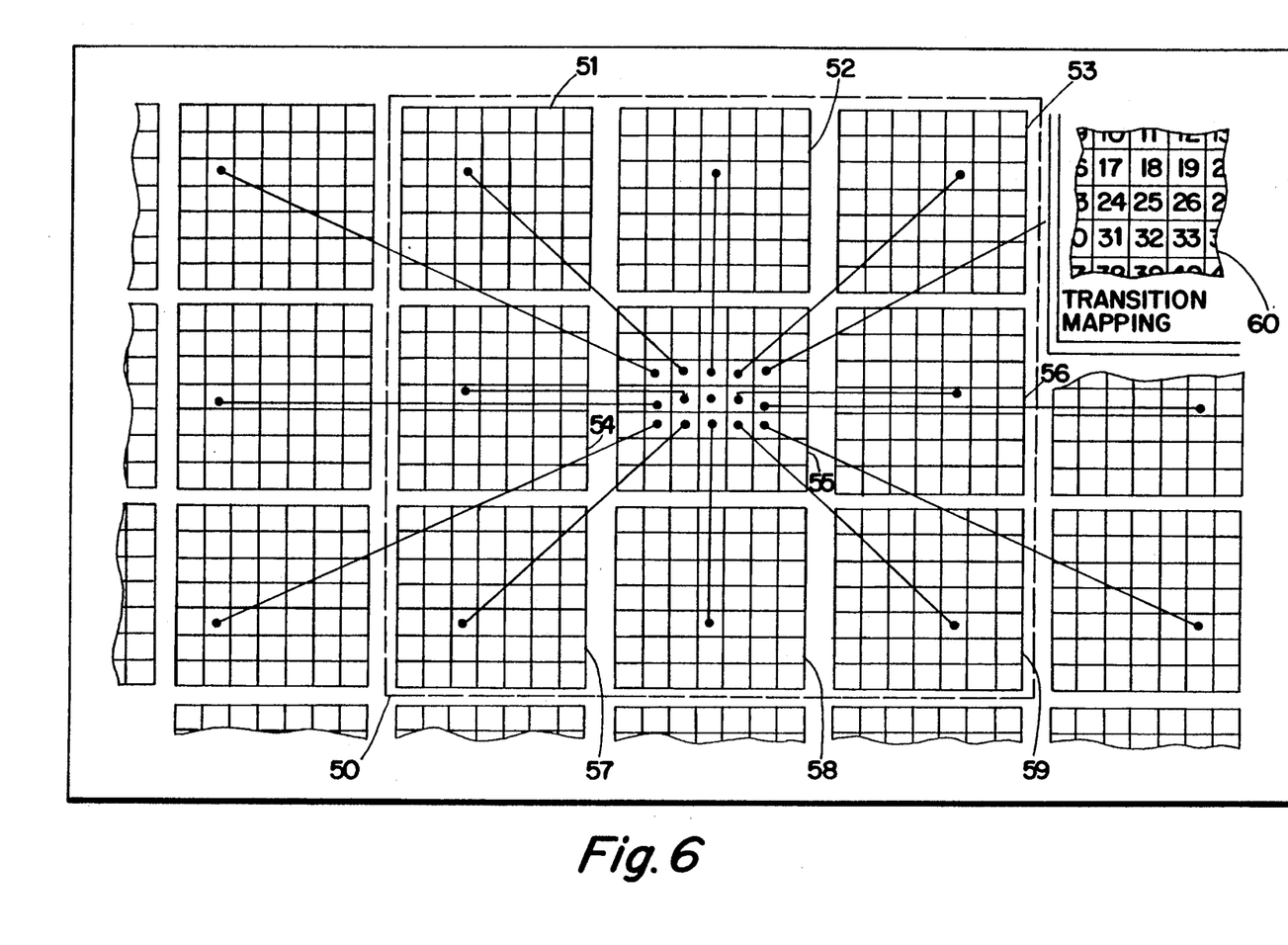
FIG. 6 is a schematic plan view of transition mapping using of a selected VNN for velocity quantization.

The vector neural network (VNN) of the present invention accommodates different velocity targets through a process of pixel quantization and in turn allows for a means of estimating the speed of the targets. Pixel quantization is illustrated by FIG. 6 by description of a scenario where targets move either 0,1,2 or 3 sub-pixels a frame. The dashed single pixel 50 is a square delimiting the nine sub-pixels 51 through 59. Like the VNN interconnect description in view of FIGS. 3 and 4, directional interconnections (14 directional interconnects are illustrated but it is understood that the total number of such interconnects can be more or less than these 14) are made between respective neuron sites in each sub-pixel to accommodate target flow in each possible direction as specified by the adopted transition mapping. FIG. 6 is based upon each sub-pixel having not nine but 49 neuron sites as shown by transition mapping window 60, with pixel 50 identified as a square pixel bounded by the solid line. Thus, neuron site 31 of transition mapping window 60 equates to motion from sub-pixel site 55 to sub-pixel site 57 of pixel 50, etc.

In the VNN of the present invention, the tertiary quantization method of FIG. 6 has been implemented on a Symbolics ® (Symbolics, Inc., Burlington, MA) computer utilizing a PLEXI ® neural network emulator (Plexi, Inc., Belmont, CA). To allow for quasi real-time implementation, the field of view is assumed to be 10×10 as portrayed in FIGS. 7 through 10. Target-truth history is provided by box 70 labeled TARGET-TRUTH while the instantaneous declared target position is provided by box 72 labeled CURRENT-TARGET POSITION. The TARGET-DETECTION box 74 is the representation of the VNN. The activation level in each sub-pixel is the maximum value of the 49 neuron activations corresponding to each sub-pixel as has been described in view of FIG. 6.

Figure 7:
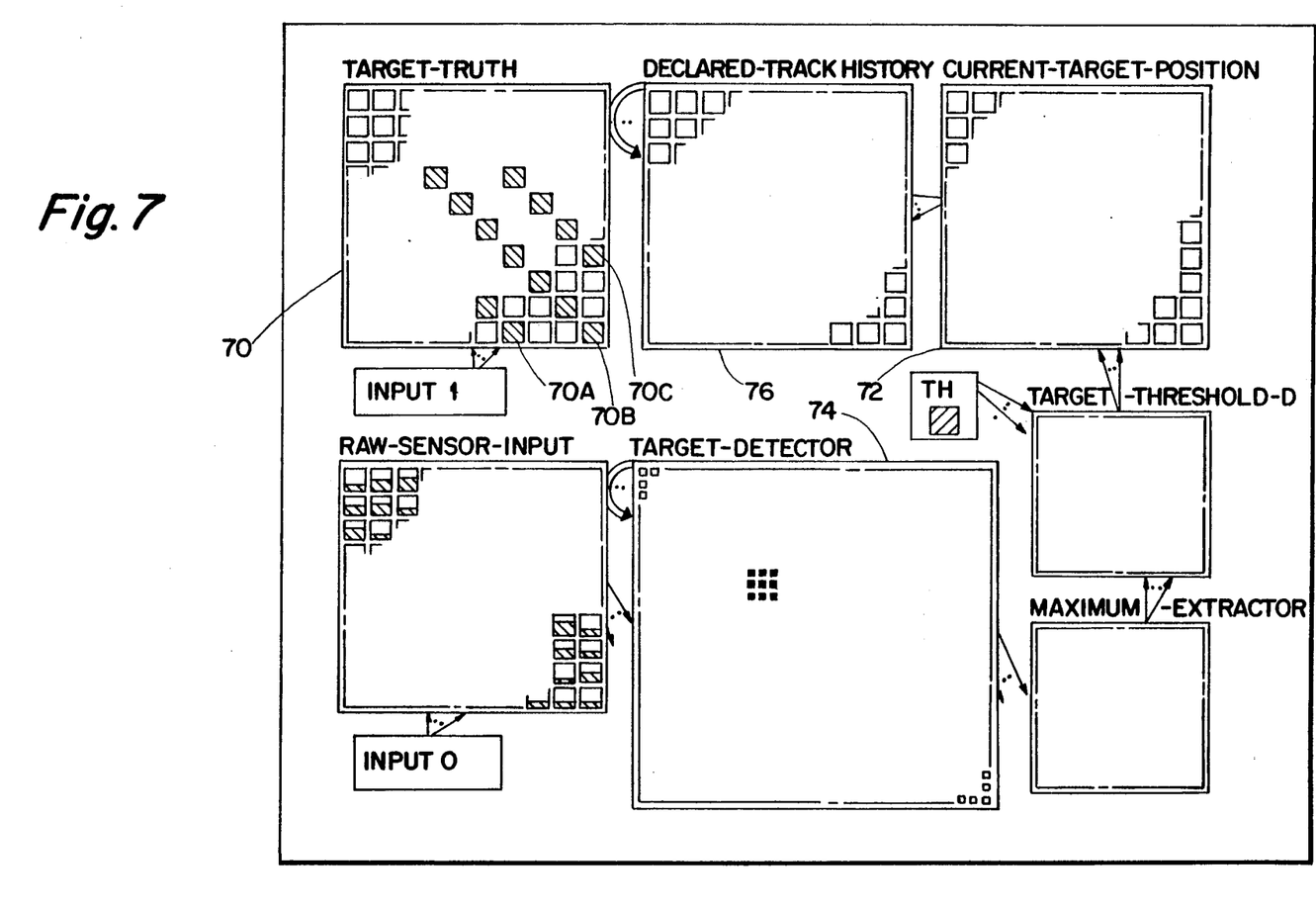
FIG. 7 is visual display screen showing a simulated VNN track-before-detect scenario at Frame 6.
Figure 8:
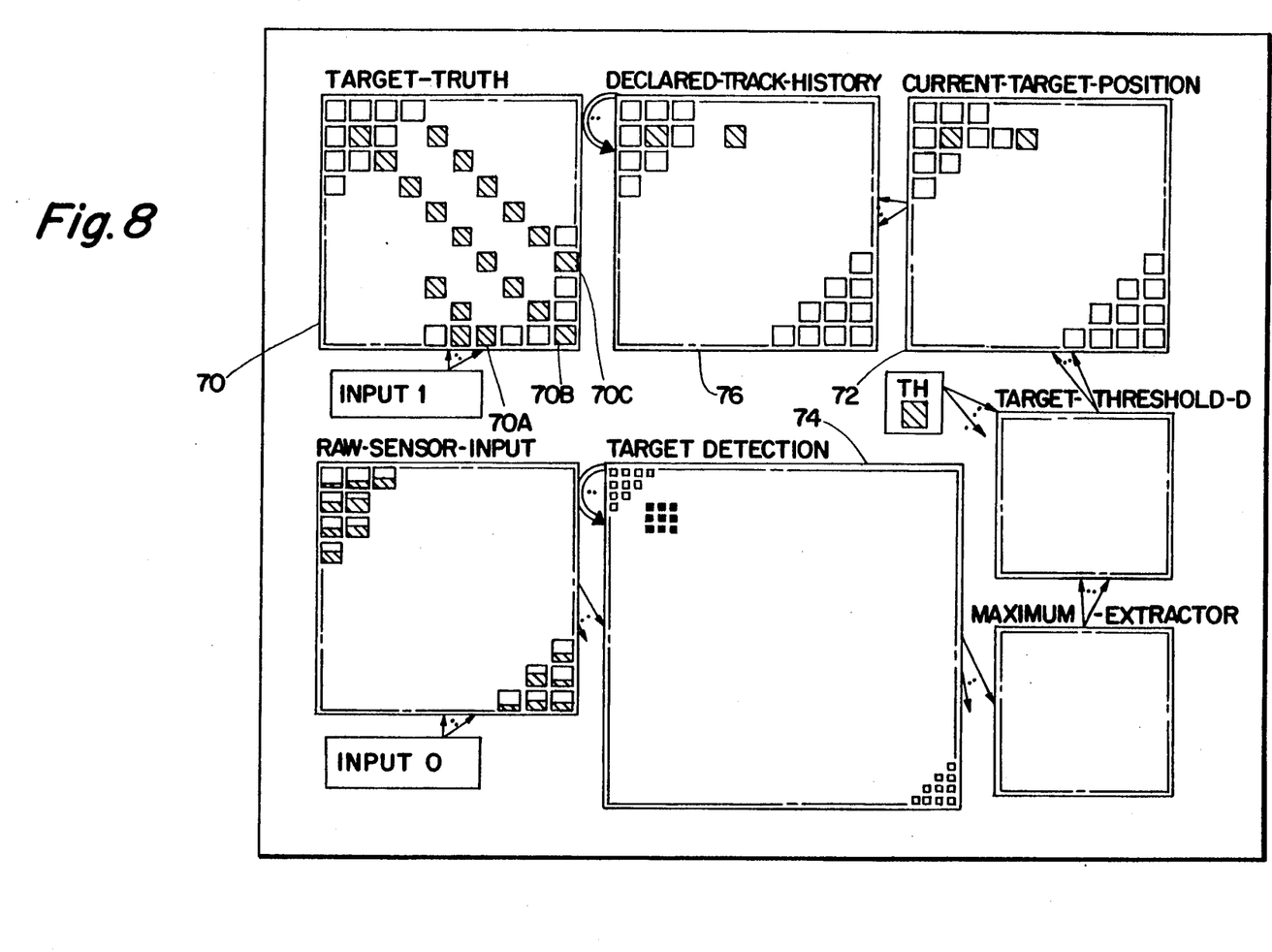
FIG. 8 is the visual display screen showing the simulated scenario of FIG. 7 having progressed to Frame 8.
Figure 9:
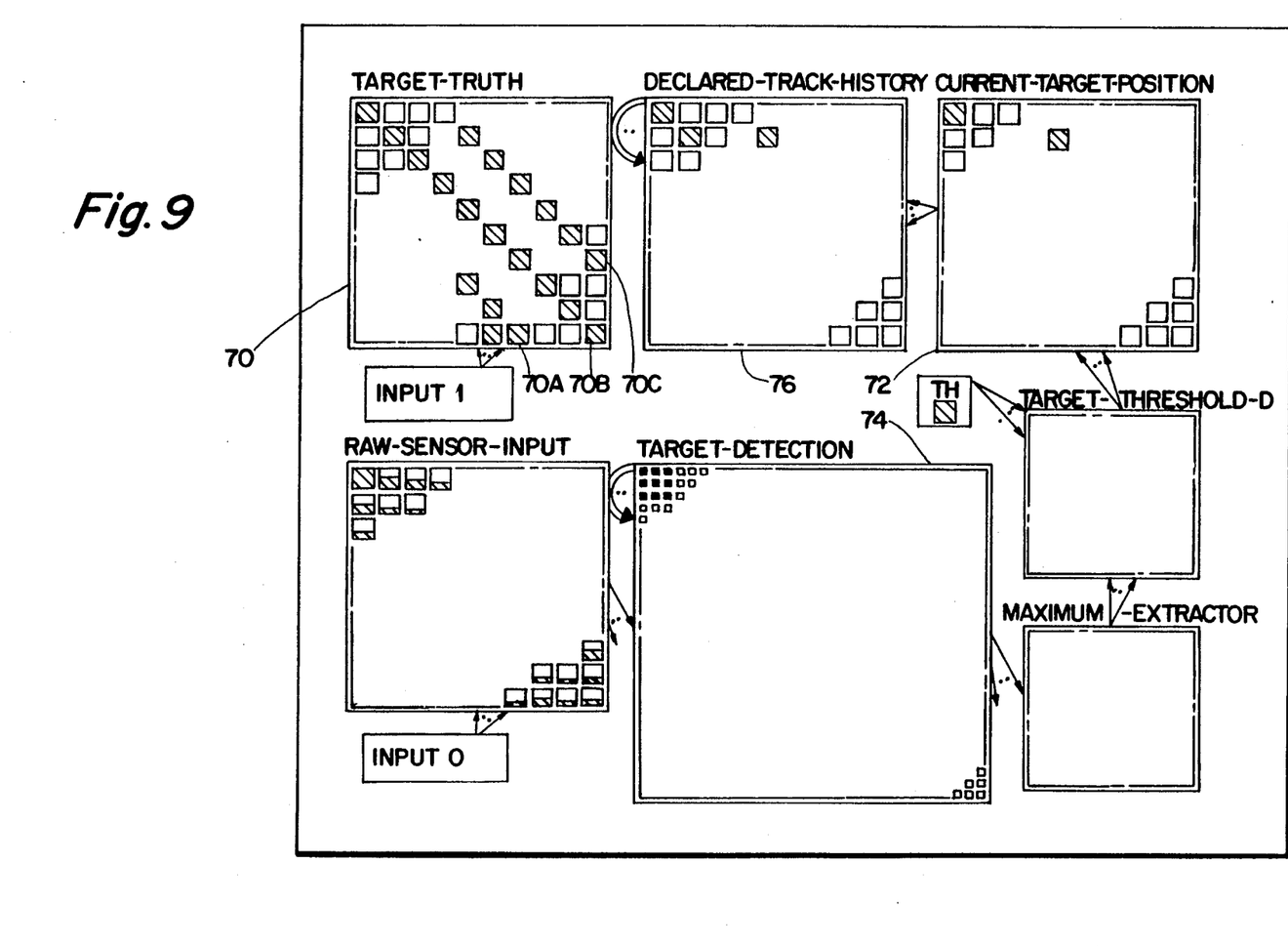
FIG. 9 is the visual display screen showing the scenario of FIG. 7 at Frame 9.
Figure 10:
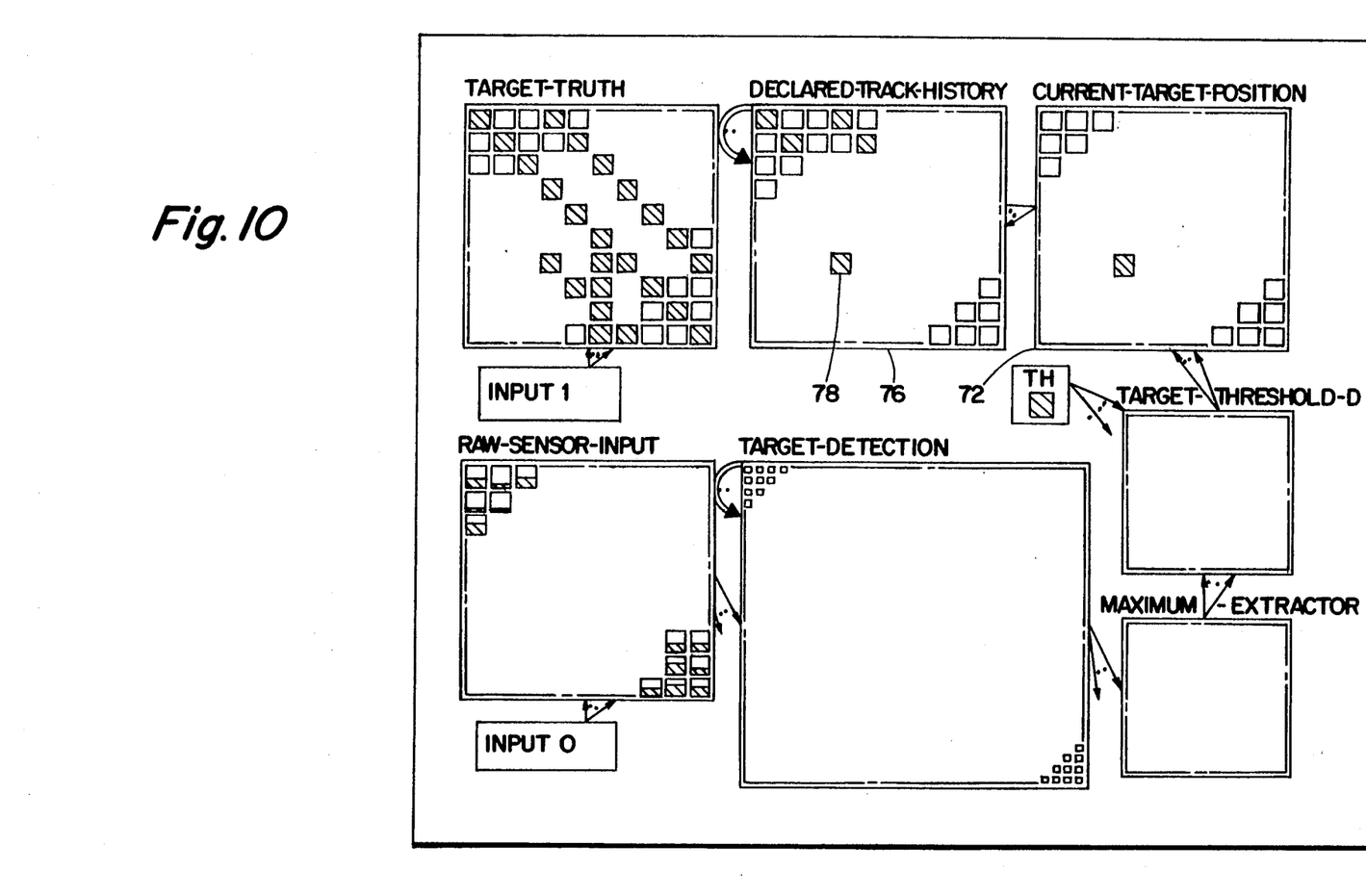
FIG. 10 is the visual display screen and the scenario of FIG. 7 having progressed to Frame 12.

In FIG. 7, three target tracks 70A, 70B and 70C, are displayed in the target-truth box 70. The instantaneous target positions are the heads of the track. By the eighth frame as represented by FIG. 8, the VNN has sufficient confidence such that two of the three targets, 70B and 70C, can be declared as targets as recorded by the DECLARED-TRACK-HISTORY box 76. And this is reinforced by the immediately following frame nine which is shown by FIG. 9. Then as the VNN continues in FIG. 10, the present invention identifies a target 78 with a first lock-on within the CURRENT-TARGET-POSITION box 72. Note that for each of these declared targets, a corresponding pixel-target track is created within the DECLARED-TARGET-HISTORY box 76.

The information concerning each of the detected targets in box 72 is forwarded to the downstream tracker, such as tracker 26 of FIG. 1 for track maintenance and track initiation. The information forwarded to the tracker are referred to as "vector" plots, in lieu of the standard nomenclature-plots, to underscore that additional attribute information is being generated by the VNN, namely speed and heading. (The vector plot output of the VNN is the basis for naming the neural network of the invention as described herein as "Vector Neural Networks".)

Figure 11:
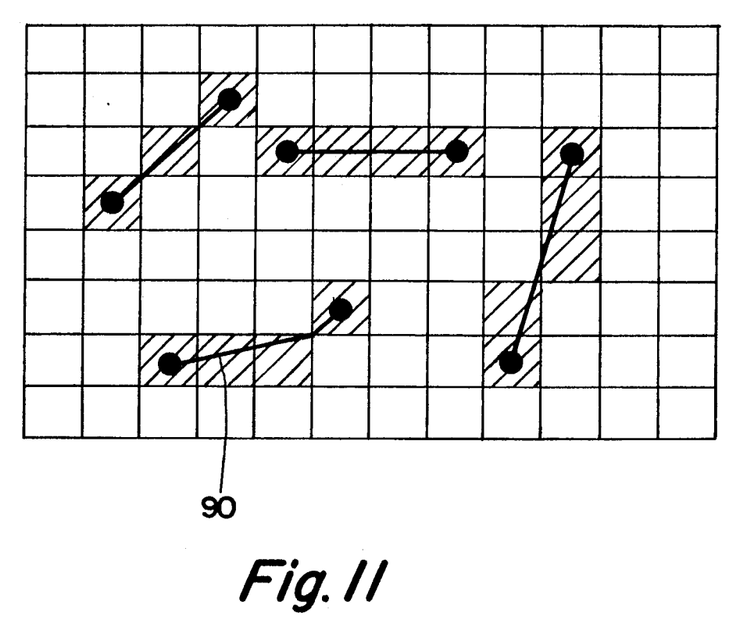
FIG. 11 is a geometric and schematic representation of potential target trajectories.

Targets do not necessarily move in a co-linear, pixel path. As illustrated in FIG. 11, targets do maneuver; targets do change path direction.

For example, a target represented by track 90 on the pixel geometry of FIG. 11 evidences a change in path direction within a 2×4 pixel rectangle. Since it is imperative that the VNN be capable of detecting target maneuvers, the VNN invokes energy balancing of hypotheses. Recall that integrating energy over multiple frames is achieved in the VNN of the present invention by postulating a number of hypothesis (tracks) and propagating them recursively over multiple frames. For batch processing of multiple frames of data, it is possible to integrate data both in a forward sweep and a backward sweep. Thus, at every pixel and at every iteration, it is possible to compare the ordering of the energy values of the positive flow hypotheses downstream of the pixel to the ordering of the values of the negative flow hypotheses upstream of the pixel. In situations where a reordering is observed, a maneuver is declared and the energy is exchanged amongst positive flow hypotheses so as to match the ordering of the upstream negative flow hypotheses.

It is important to point out that in lieu of utilizing backflow, one can also "look-forward", whereby the ordering of positive flow hypotheses upstream of the subject pixel is compared against the ordering of the downstream positive flow hypotheses "looking-forward". The number of frames needed to be integrated "looking-forward" is determined by the SNR; the higher the SNR, the fewer frames are needed.

Figure 12:
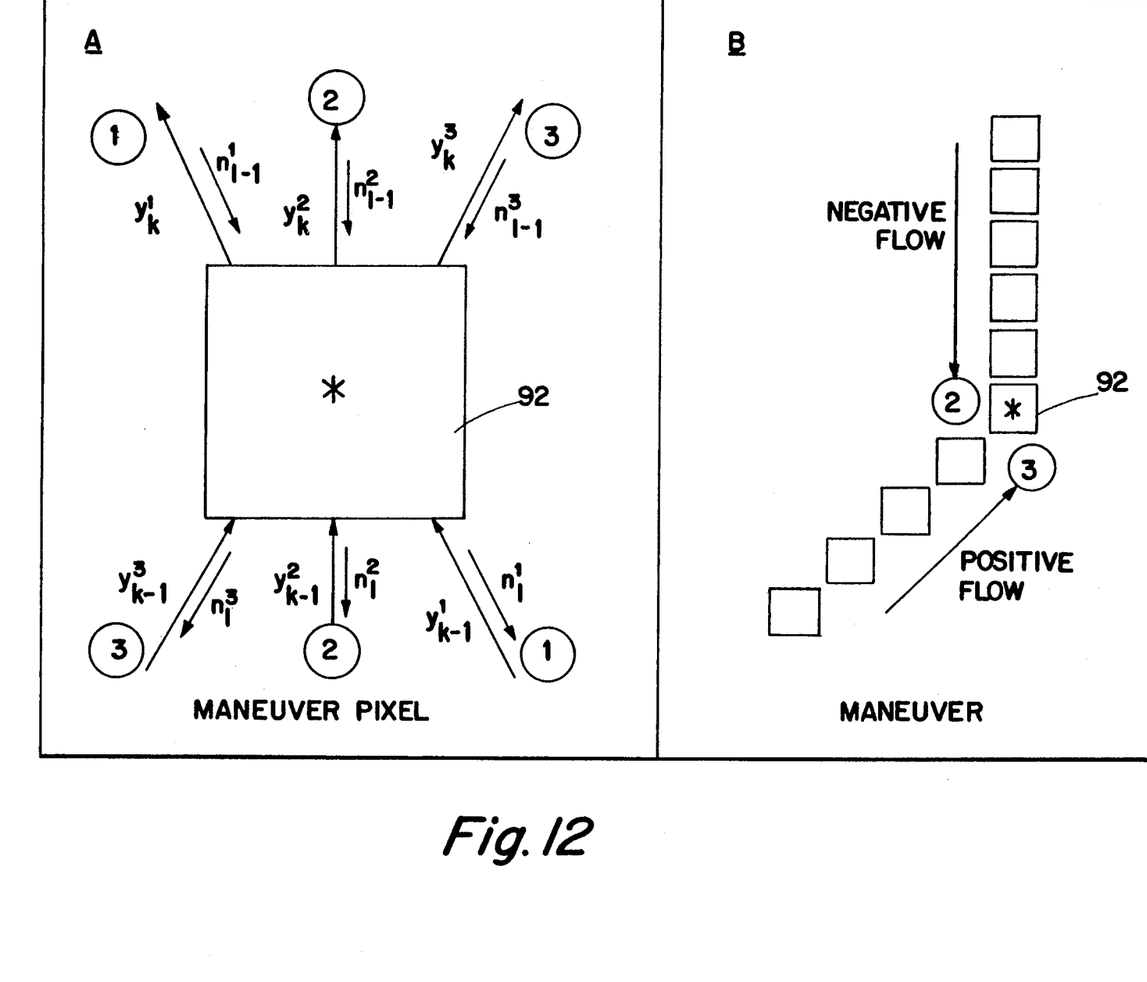
FIG. 12A is a schematic of a maneuver pixel of FIG. 4 using another form of VNN for maneuver detection and energy adjustment.
FIG. 12B is a schematic of a single maneuver detected and energy adjusted by the VNN maneuver pixel of FIG. 12A.

In FIG. 12A and 12B, for illustrative purposes consider the simplified case. Assuming that a target can move only in three directions and that only one target is present, then it follows that at the instant the target is traversing the "starred" pixel 92 the positive "3" direction energy, i.e., $y^3{}_{k-1}$, will dominate: $y^3{}_{k-1} > y_{k-}$ and $y^2_{k-1} > y^1_{k-1}$, since the target has moved along the "3" direction prior to k-1, as illustrated in FIG. 12. With only one target, the energies $y^2_{k-1}$ and $y^1_{k-1}$ are solely the result of integrating noise.

Under nominal conditions, if the target was to move in a straight line motion through the "starred" pixel 92 and continue moving in the "3" direction for a reasonable number of frames, then the negative "3" direction energy would dominate; $n^3_{1-1} > n^2_{1-1}$ and $n^3_{1-1} > n^1_{1-1}$. Under these conditions the aforementioned recursive energy update equations would be utilized. However, if the target does in fact maneuver in the "starred" pixel 92, then $n^3_{1-1}$ would not dominate. As illustrated in Figure 12, it is expected that $n^2_{1-1}$ would dominate since the target is shown to in fact move in the "2" direction subsequent to frame k.

Thus, so as to preserve the information contained in $y^3_{k-1}$, it is desirable to "swap" the energy $y^3_{k-1}$ with $y^2_{k-1}$. Thereafter, the energy update equations described above can be applied.

Figure 13:
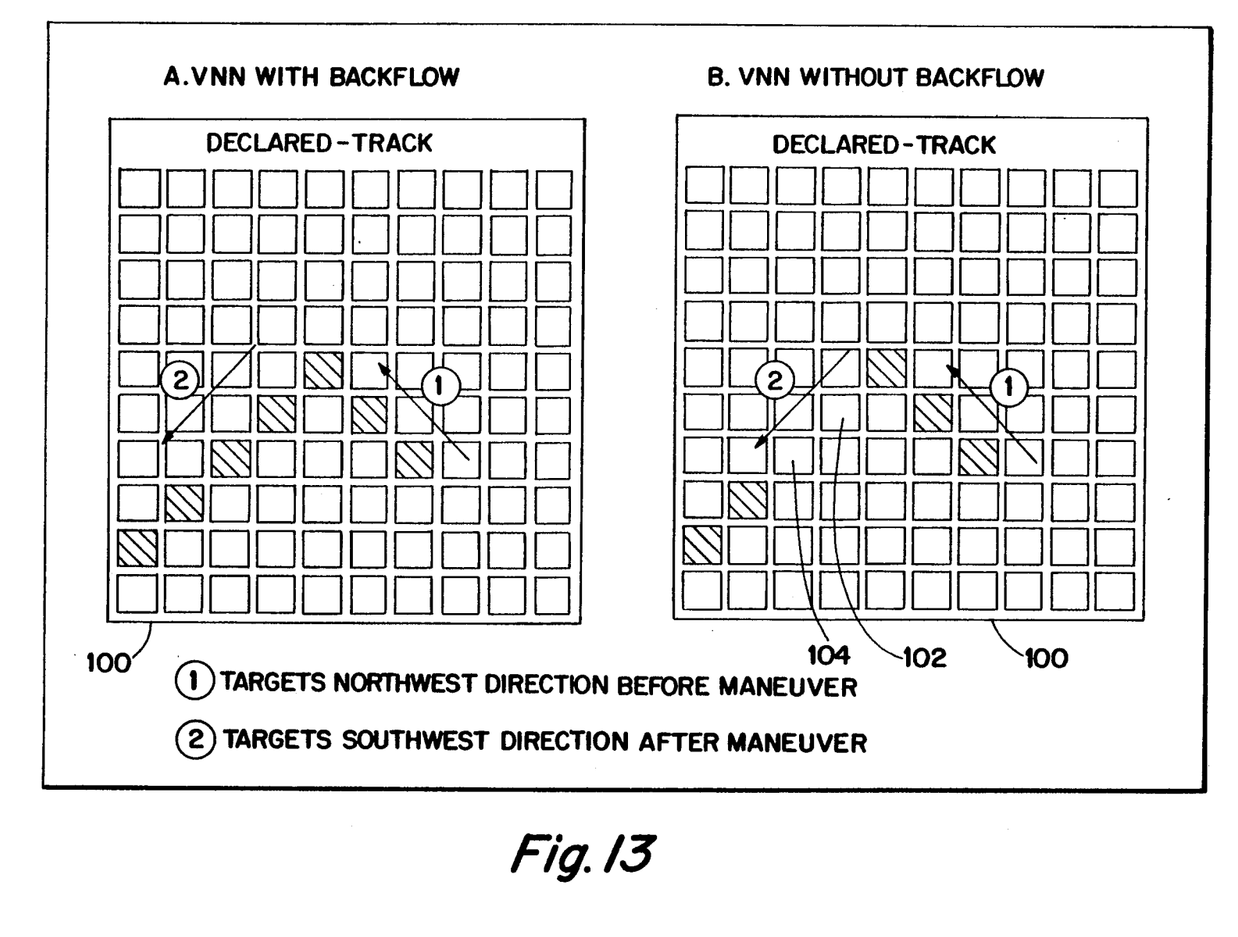
FIG. 13A is the DECLARED-TRACK-HISTORY portion of the visual display screen of FIG. 10 showing a VNN with backflow.
FIG. 13B is the DECLARED-TRACK-HISTORY portion of FIG. 13A showing a VNN without backflow.

Thus, by recursively invoking an energy balancing at each sub-pixel, the VNN of the invention can ensure that tract continuity is preserved in a track-before-detect setting as illustrated in the DECLARED-TRACK-HISTORY box 100 of FIG. 13A. The VNN augmented with backflow successfully detected the V-maneuver of a target, properly switching energy from the hypothesis in the northwesterly direction (North being at the top of box 100 for purposes of description) to the southwesterly direction. There was no loss of information, and track continuity was achieved through the maneuver.

Without backflow, the VNN would not be able to detect the target maneuver and would continue to blindly propagate energy straight ahead in the northwesterly direction. As can be seen in the DECLARED-TRACK-HISTORY box 100 of FIG. 13B., this results in the loss of information since all energy along the original flight path in the northwesterly direction slowly dissipates as a result of the alpha decay control parameter. Thus, there is loss of continuity until the VNN hypothesis for the southwesterly direction corresponding to the flight path in successive frames builds up sufficient energy to again cross the threshold. This is best illustrated by the loss of target track at pixels 102 and 104 of FIG. 13B when compared to these same pixels of FIG. 13A. Clearly, such loss of continuity could be disastrous in dense environments. Furthermore, for lower SNR scenarios, insufficient energy may be collected to achieve a threshold crossing, prior to maneuver. In such a case, the target may never be detected without backflow.

In the previous scenario as illustrated by FIG. 13A, the VNN with backflow handled a target changing direction. The VNN (with backflow) can also accommodate targets which change speeds. This is particularly important in that it delimits the complexity of the VNN brought forth by sub-pixel quantization. Since it is unknown at what speeds the targets will be moving, the full regime of potential target velocities must be quantized in terms of both heading and speed. This is accomplished by subdividing each pixel into smaller and smaller subpixels. One drawback of this approach is that the number of neurons grows as N-squared, where N is the quantization level of each pixel.

Fortunately, the VNN with backflow, obviates the need for extremely fine quantization. It is possible to utilize a coarser grain quantization and rely on the backward flow maneuver detection logic to effectively provide an interpolation or smoothing between quantized velocity values.

For example, the VNN would be capable of detecting a target moving at 1.5 sub-pixels per frame, even though only hypotheses assuming 1 and 2 sub-pixel per frame motion are postulated. Effectively, the VNN intermittently switches between the hypotheses of 1 and 2 sub-pixels per frame, as called for by the backflow detection logic, and thus capturing the energy corresponding to a 1.5 sub-pixel per frame target.

Energy balancing for maneuver detection also has broader applicability than IR track-before-detect. It can be readily applied for any multiple hypothesis tracking schemes which would allow for batch processing of a nominal number "L" of subsequent frames (scans) of input data, which is equivalent to accepting a delay of "L" frames (scans).

It can be observed and understood from the foregoing that the vector neural network (VNN) of the present invention provides for the encoding of directional information into the neural network which occurs by the one-to-one mapping between paired neurons, as defined by the transition mapping of the instant scenario.

Thus, by recursively invoking an energy balancing at each pixel one can ensure that integration along an unknown maneuver trajectory, in a track-before-detect setting is achieved. Thus detection of dim maneuvering targets can be ensured and track continuity in the tracker preserved.

The VNN of the invention accomplishes, inter alia, the following:

Significant reduction in the exhaustive numbers of hypotheses postulated by only postulating straight-line flight (frame-to-frame) and accounting for maneuvers with backflow and associated switching of integrated energies, so as to in effect allow for contour integration along trajectories which are determined in real-time.

Capable of detecting maneuvering, crossing and different velocity targets. Furthermore, the processing load is not a function of the number of targets. The hypotheses are postulated, a priori, as set forth by the transition map which accounts for all target motion of interest for a given application.

Significantly higher "virtual" sensor resolution provided by sub-pixelization and integration. Sub-pixelization is introduced so a to be able to account for sub-pixel velocity targets. However, in addition, it provides knowledge as to where in the pixel, i.e., which sub-pixel, is the most likely location of the detected target. Thus, based merely on data processing, the "resolution" of the sensor can be enhanced.

Vector plot output of the VNN alleviates plot/track association function in the tracker. One of the major computational burdens of the tracker is resolving contention between potential pairings of established tracks and new detections The velocity information embedded in the vector plot output significantly reduces the numbers of contentions.

An emulation of the VNN is readily implementable on currently available, massively parallel computers, even for large focal planes requiring very large (millions) of neurons. This is a result of the unique topology of the network which makes it extremely sparse. In a recursive implementation, a neuron is connected to at most one other neuron corresponding to the direction and speed postulated by the underlying hypothesis. Such a topology greatly simplifies the emulation of the VNN. The VNN can be expected to be readily implemented in analog VLSI or optical computers to achieve higher throughput.

As will be evidenced from the foregoing description, certain aspects of the invention ar not limited to the particular details of construction and of function as illustrated and described. It is contemplated that modifications and other applications will occur to those skilled in this art. However, it is intended that the appended claims shall cover such modifications and applications which do not depart from the true spirit and scope of the present invention.

We claim:

1. A vector neural network (VNN) for the detection of a potential target where the energy of the target is insufficient in reference to a determinable signal-to-noise ratio (SNR) operating condition CHARACTERIZED IN THAT THE VNN comprises:

a) first means to establish operating control parameters for the VNN in response to the SNR where said control parameters include
      (1) postulating a plurality of target tracks,
      (2) propagating said tracks in a network of interconnected neurons,
      (3) encoding said tracks to directional target energies,
   b) second means to integrate target energies along at least one target track to develop a continuous target track over a function of both time and space,
   c) third means to declare a target location by deferred thresholding of said integrated target energies relative to the SNR, and
   d) fourth means to determine target direction by a backflow process with associated switching of said integrated target energies along said continuous target track.

2. The VNN of claim 1 in which target declaration includes target velocity.

3. The VNN of claim 2 in which said target declaration includes target acceleration.

* * * * *